US010203864B2

(12) United States Patent
Ju et al.

(10) Patent No.: US 10,203,864 B2
(45) Date of Patent: Feb. 12, 2019

(54) INFORMATION PROCESSING METHOD AND ELECTRONIC APPARATUS

(71) Applicant: LENOVO (BEIJING) CO., LTD., Beijing (CN)

(72) Inventors: Na Ju, Beijing (CN); Haifeng Yu, Beijing (CN); Ke Shang, Beijing (CN); Guang Yang, Beijing (CN)

( * ) Notice: Subject to any disclaimer, the term of this patent is extended or adjusted under 35 U.S.C. 154(b) by 359 days.

(21) Appl. No.: 14/109,367

(22) Filed: Dec. 17, 2013

(65) Prior Publication Data

US 2014/0173485 A1    Jun. 19, 2014

(30) Foreign Application Priority Data

Dec. 18, 2012    (CN) .......................... 2012 1 0551605

(51) Int. Cl.
     *G06F 3/0488*      (2013.01)
     *G06F 3/0486*      (2013.01)
     *G06F 21/62*      (2013.01)

(52) U.S. Cl.
     CPC .......... *G06F 3/0488* (2013.01); *G06F 3/0486* (2013.01); *G06F 21/6218* (2013.01); *G06F 2203/04803* (2013.01)

(58) Field of Classification Search
     CPC ................. G06F 3/0488; G06F 3/0486; G06F 2203/04803; G06F 3/041; G06F 3/04886
     See application file for complete search history.

(56) References Cited

U.S. PATENT DOCUMENTS

| | | | |
|---|---|---|---|
| 2007/0033539 A1* | 2/2007 | Thielman ................. | G06F 1/16 715/769 |
| 2007/0092118 A1* | 4/2007 | Tachibana ............... | A63F 13/10 382/125 |
| 2007/0106942 A1* | 5/2007 | Sanaka ............... | G06F 3/04883 715/733 |
| 2011/0193810 A1* | 8/2011 | Park .................... | G06F 3/04886 345/173 |
| 2011/0231795 A1* | 9/2011 | Cheon .................. | G06F 1/3231 715/810 |

(Continued)

OTHER PUBLICATIONS

Chinese Patent Application CN 201210551605.0, Chinese Patent Office, First Office Action dated Apr. 1, 2016; 7 pages.

(Continued)

*Primary Examiner* — Shen Shiau
(74) *Attorney, Agent, or Firm* — Radlo IP Law Group; Peter Su

(57) ABSTRACT

The present disclosure discloses an information processing method applied in an electronic apparatus having a touch control display unit, the method includes detecting whether there is a first touch control operation of a first user on the touch control display unit; responding to the first touch control operation to obtain at least one piece of first touch control position information of the first touch control operation on at least one first touch control point on the touch control display unit when there is the first touch control operation; and determining a first user region belonging to a first user on the touch control display unit based on the at least one piece of first touch control position information. Further, the present disclosure also discloses an electronic apparatus corresponding to the above-described information processing method.

14 Claims, 5 Drawing Sheets

(56) References Cited

U.S. PATENT DOCUMENTS

2012/0268372 A1* 10/2012 Park ........................ G06F 3/017
　　　　　　　　　　　　　　　　　　　　　　　345/158

OTHER PUBLICATIONS

English Text of First Office Action for Chinese Patent Application CN 201210551605.0, Chinese Patent Office, First Office Action dated Apr. 1, 2016; 4 pages.

* cited by examiner

INFORMATION PROCESSING METHOD AND ELECTRONIC APPARATUS

CROSS REFERENCE TO RELATED APPLICATIONS

This application claims the benefit under 35 U.S.C. § 119(a) of Chinese Patent Application No. 201210551605.0, filed on Dec. 18, 2012, the entire disclosure of which is incorporated by reference herein in its entirety.

BACKGROUND

The present disclosure relates to the field of communication and electronic technology, and particularly to an information processing method and an electronic apparatus.

With the progressive development of technology, the office working mode of people also has great changes, and electronic apparatus applied in an office environment becomes more and more diversified, so that office intellectualization is increasingly higher. When there is a meeting, people can use electronic apparatus having a capacitive touch screen such as a PAD, a notebook computer or the like to make meeting record and meeting interaction, the capacitive touch screen of the electronic apparatus can respond to a touch operation of the user to satisfy user's requirements.

However, the inventor of this application has found that the above-described technology at least has the following technical problems in procedure of implementing the technical solutions of the embodiments of this application:

(1) Since the capacitive touch screen can only detect a position of the touch control of the user but cannot recognize the identity of the user, there is a technical problem; a dedicated specific region cannot be divided for a specific user on a large size capacitive screen, according to position information of the touch control of the specific user to be used by the specific user.

(2) Since a dedicated specific region cannot be divided for a specific user, when a plurality of users use one capacitive touch screen, there is problem that personal privacy of each user cannot be protected effectively, thus, degree of using experience of the user is reduced.

SUMMARY

The embodiments of the present disclosure solve the technical problem that a dedicated specific region cannot be divided for a specific user on a large size capacitive screen according to touch control position information of the specific user to be used by the specific user by providing an information processing method.

In order to solve the above-described technical problem, the embodiments of the present disclosure provide an information processing method applied in an electronic apparatus having a touch control display unit, the method including detecting whether there is a first touch control operation of a first user on the touch control display unit; responding to the first touch control operation to obtain at least one piece of first touch control position information of the first touch control operation on at least one first touch control point on the touch control display unit when there is the first touch control operation; and determining a first user region belonging to the first user on the touch control display unit based on the at least one piece of first touch control position information.

Preferably, determining the first user region belonging to the first user on the touch control display unit based on the at least one piece of first touch control position information specifically includes receiving first ID information corresponding to the first user sent by a first ID transmitter; and determining the first user region belonging to the first user on the touch control display unit based on the first ID information and the at least one piece of first touch control position information.

Preferably, after determining the first user region belonging to the first user on the touch control display unit based on the at least one piece of first touch control position information, the method further includes detecting whether there is a second touch control operation of a second user on the touch control display unit; responding to the second touch control operation to obtain at least one piece of second touch control position information of the second touch control operation on at least one second touch control point on the touch control display unit when there is the second touch control operation; and determining a second user region belonging to the second user on the touch control display unit based on the at least one piece of second touch control position information, wherein the first user region and the second user area are regions without any overlapping.

Preferably, determining the second user region belonging to the second user on the touch control display unit based on the at least one piece of second touch control position information specifically includes receiving second ID information corresponding to the second user sent by a second ID transmitter; and determining the second user region belonging to the second user on the touch control display unit based on the second ID information and the at least one piece of second touch control position information.

Preferably, after determining the second user region belonging to the second user on the touch control display unit, the method further includes determining a public region on the touch control display unit based on the first user region and second user region, wherein the public region is a region that does not overlap with the first user region or the second user region.

Preferably, after determining the public region on the touch control display unit, the method further includes detecting whether there is a first dragging operation for dragging a first file in the first user region to the public region on the touch control display unit; and responding to the first dragging operation to move the first file into the public region when there is the first dragging operation.

Preferably, after responding to the first dragging operation to move the first file into the public region when there is the first dragging operation, the method further includes detecting whether there is a second dragging operation for dragging the first file in the public region into the second user region on the touch control display unit; and responding to the second dragging operation to move the first file into the second user region when there is the second dragging operation.

Preferably, when the first file is a ciphered first file, responding to the first dragging operation to move the first file into the public region when there is the first dragging operation specifically includes responding to the first dragging operation to decipher the ciphered first file to obtain a deciphered first file; and moving the deciphered first file into the public region.

Preferably, responding to the second dragging operation to move the first file into the second user region when there is the second dragging operation specifically includes responding to the second dragging operation to cipher the first file to obtain a ciphered first file; and Moving the ciphered first file into the second user region.

Preferably, after determining the public region on the touch control display unit, the method further includes detecting whether there is a third dragging operation of the first user for dragging a second file in the first user region to the second user region on the touch control display unit; obtaining authentication information to be authenticated as input by the second user when there is the third dragging operation; authenticating the second user based on the authentication information to be authenticated to obtain an authentication result; and responding to the third dragging operation to move the second file from the first user region into the second user region when the authentication result represents that the authentication is successful.

Based on the same inventive concept, the embodiments of the present disclosure also provide an electronic apparatus corresponding to the above information processing method and provide a solution to the technical problem that a dedicated specific region cannot be divided for a specific user on a large size capacitive screen, according to touch control position information of the specific user so as to be used by the specific user. The electronic apparatus has a touch control display unit, the electronic apparatus including a first detecting unit for detecting whether there is a first touch control operation of a first user on the touch control display unit; a first obtaining unit connected to the first detecting unit and for responding to the first touch control operation to obtain at least one piece of first touch control position information of the first touch control operation on at least one first touch control point on the touch control display unit when there is the first touch control operation; and a first determining unit connected to the first obtaining unit and for determining a first user region belonging to the first user on the touch control display unit based on the at least one piece of first touch control position information.

Preferably, the first determining unit specifically includes a first receiving unit for receiving first ID information corresponding to the first user sent by a first ID transmitter; and a first determining sub-unit connected to the first receiving unit and for determining the first user region belonging to the first user on the touch control display unit based on the first ID information and the at least one piece of first touch control position information.

Preferably, the electronic apparatus further includes a second detecting unit for detecting whether there is a second touch control operation of a second user on the touch control display unit; a second obtaining unit connected to the second detecting unit and for responding to the second touch control operation to obtain at least one piece of second touch control position information of the second touch control operation on at least one second touch control point on the touch control display unit when there is the second touch control operation; and a second determining unit connected to the second obtaining unit and for determining the second user region belonging to the second user on the touch control display unit based on the at least one piece of second touch control position information, wherein the first user region and the second user area are regions without any overlapping.

Preferably, the second determining unit specifically includes a second receiving unit for receiving second ID information corresponding to the second user sent by a second ID transmitter; and a second determining sub-unit connected to the second receiving unit and for determining the second user region belonging to the second user on the touch control display unit based on the second ID information and the at least one piece of second touch control position information.

Preferably, the electronic apparatus further includes a third determining unit for determining a public region on the touch control display unit based on the first user region and the second user region, wherein the public region is a region that does not overlap with the first user region and the second user region.

Preferably, the electronic apparatus further includes a third detecting unit for detecting whether there is a first dragging operation for dragging a first file in the first user region to the public region on the touch control display unit; and a first executing unit connected to the third detecting unit and for responding to the first dragging operation to move the first file into the public region when there is the first dragging operation.

Preferably, the electronic apparatus further includes a fourth detecting unit for detecting whether there is a second dragging operation for dragging the first file in the public region to the second user region on the touch control display unit; and a second executing unit connected to the fourth detecting unit and for responding to the second dragging operation to move the first file into the second user region when there is the second dragging operation.

Preferably, the first executing unit specifically includes a first deciphering unit for responding to the first dragging operation to decipher a ciphered first file to obtain a deciphered first file; and a first executing sub-unit connected to the first deciphering unit and for moving the deciphered first file into the public region.

Preferably, the second executing unit specifically includes a first ciphering unit for responding to the second dragging operation to cipher the first file to obtain the ciphered first file; and a second executing sub-unit connected to the first ciphering unit and for moving the ciphered first file into the second user region.

Preferably, the electronic apparatus further includes a fifth detecting unit for detecting whether there is a third dragging operation of the first user for dragging a second file in the first user region to the second user region on the touch control display unit; a third obtaining unit connected to the fifth detecting unit and for obtaining authentication information to be authenticated as input by the second user when there is the third dragging operation; a fourth obtaining unit connected to the third obtaining unit and for authenticating the second user based on the authentication information to be authenticated to obtain an authentication result; and a third executing unit connected to the fourth obtaining unit and for responding to the third dragging operation to move the second file from the first user region into the second user region when the authentication result represents that the authentication is successful.

One or more technical solutions provided by the embodiments of the present disclosure at least have the following technical effects or advantages:

(1) Since a technical solution, in which a touch control region belonging to a specific user is determined according to touch control position information of the specific user in combination with unique ID information of the specific user is adopted, it solves the technical problem that a dedicated specific region cannot be divided for the specific user on a large size capacitive screen, according to the touch control position information of the specific user to be used by the specific user in the prior art and has the technical effect of being able to divide different touch control regions for different users on a touch control display unit.

(2) In addition, since different touch control regions can be divided for different users on a touch control display unit, different users can only operate on their own touch control regions, thus, it has an effect of protecting personal privacy of the user better and increasing using experience of the user greatly.

DETAILED DESCRIPTION

The embodiments of this application solve the technical problem that a dedicated specific region cannot be divided for a specific user on a large size capacitive screen according to touch control position information of the specific user to be used by the specific user by providing an information processing method and an electronic apparatus.

The overall concept of the technical solution in the embodiments of this application for solving the above technical problem is as follows:

Firstly, the electronic apparatus detects whether there is a first touch control operation of a first user on a touch control display unit, and responds to the first touch control operation to obtain at least one piece of first touch control position information of the first touch control operation on at least one first touch control point on the touch control display unit when the first touch control operation is detected, and finally, determines a first user region belonging to the first user on the touch control display unit according to the at least one piece of first touch control position information and possibly in combination with other required information.

In order to understand the above-described technical solution better, the above-described technical solution is described in detail in combination with accompanying drawings of the specification and specific implementation modes, and optimization processing is made to the technical solution.

Figure 1:
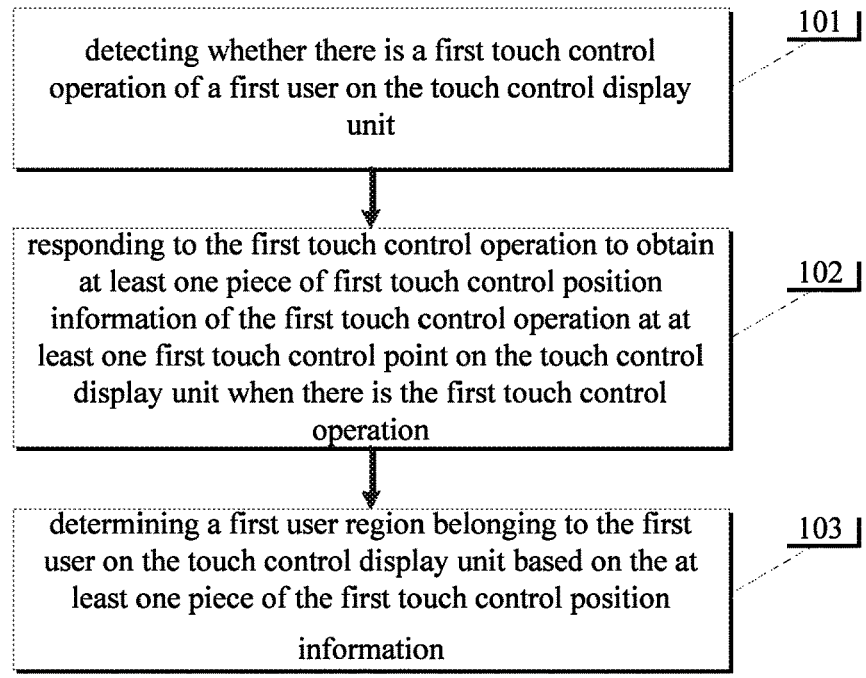
FIG. 1 is a flow chart of specific implementation of an information processing method in the embodiments of this application.

The information processing method provided by the embodiments of this application is for solving the technical problem that a dedicated specific region cannot be divided for a specific user on a large size capacitive screen according to touch control position information of the specific user so as to be used by the specific user in the prior art. The information processing method is applied in an electronic apparatus having the touch control display unit, the specific flow chart of the information processing method is shown in FIG. 1, which includes:

Step 101: detecting whether there is a first touch control operation of a first user on the touch control display unit.

In the specific implementation procedure, the technical solution of the embodiments of this application is applied in an electronic apparatus having a large size capacitive touch screen, the technical solution of the present disclosure is described in detail in the embodiments of this application by taking a tablet computer having a capacitive touch screen of 27 inches as example, the specific application scene of the tablet computer may be a multi-person meeting, for example, meeting of a department or a group inside a company or the like. The first touch control operation may be a slide operation, a click operation, a gesture operation or the like on the capacitive screen by the user, as long as an operation that can be detected and recognized by the electronic apparatus, it may be taken as the first touch control operation.

The method proceeds to step 102 when the first touch control operation is detected, and step 102 is responding to the first touch control operation to obtain at least one piece of first touch control position information of the first touch control operation on at least one first touch control point on the touch control display unit when there is the first touch control operation.

In the electronic apparatus as mentioned above, when the user makes the first touch control operation on the capacitive screen, according to principles of operation of the capacitive touch screen, there is a long and narrow electrode on each of the four corners of the capacitive screen respectively, and when the finger of the user makes a touch control operation on the capacitive screen, the electric field of the human body and the surface of the capacitive touch screen form a coupling capacitor, and the finger absorbs a very small electric current from the contact point. And the electric current flowing through the four electrodes of the capacitive screen is proportional to the distance of the finger to the four corners, a controller positioned behind the capacitive screen accurately calculates ratios of these four electric currents to derive specific position information of the touch point. Therefore, for example, when the first user makes a slide operation on the capacitive screen, the capacitive screen can respond to the slide operation to obtain the touch control position information of a series of touch control points when the slide operation slides on the capacitive screen. Moreover, when the first user only makes a click operation on the capacitive screen, the capacitive screen can obtain the touch control position information of a series of touch control points of the clicked positions of the click operation.

The method proceeds to step 103 after obtaining the at least one piece of first touch control position information, and step 103 is determining a first user region belonging to the first user on the touch control display unit based on the at least one piece of first touch control position information.

Figure 2:
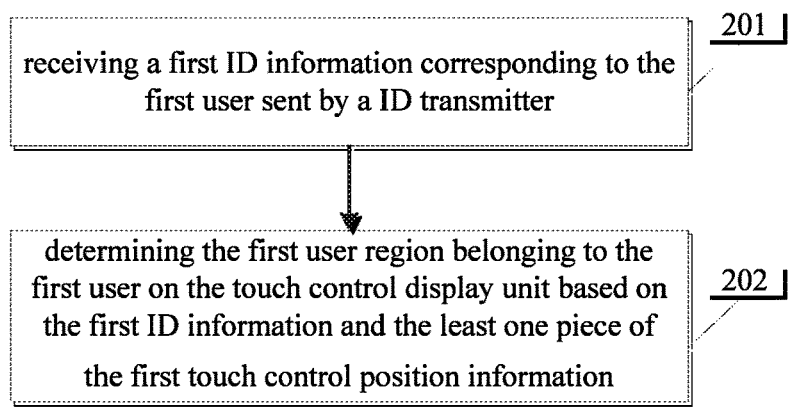
FIG. 2 is a flow chart of specific implementation of step 103 in the method of the embodiments of this application.

Since the conventional capacitive screen can detect positions of touch control of the user but cannot recognize the user, that is, it cannot divide an operation region dedicated to the user, in the specific implementation procedure, in order for the electronic apparatus to be able to divide a specific operational region for the user according to touch control position information of the user, the electronic apparatus needs to be equipped with several ID transmitters. In addition, each ID transmitter is matched with a unique ID identification code, and all of the ID identification codes are stored in the electronic apparatus. The user needs to wear the ID transmitter as using the electronic apparatus, then, the electronic apparatus can determine the operation region belonging to the user according to the specific touch control position information and the unique ID identification code of the user. thus, the specific implementation procedure of the above step 103 is shown in FIG. 2, which includes:

Step 201: receiving first ID information corresponding to the first user sent by a first ID transmitter;

Step 202 is proceeded to after obtaining the first ID information, and step 202 is determining the first user region belonging to the first user on the touch control display unit based on the first ID information and the at least one piece of first touch control position information.

Figure 3:
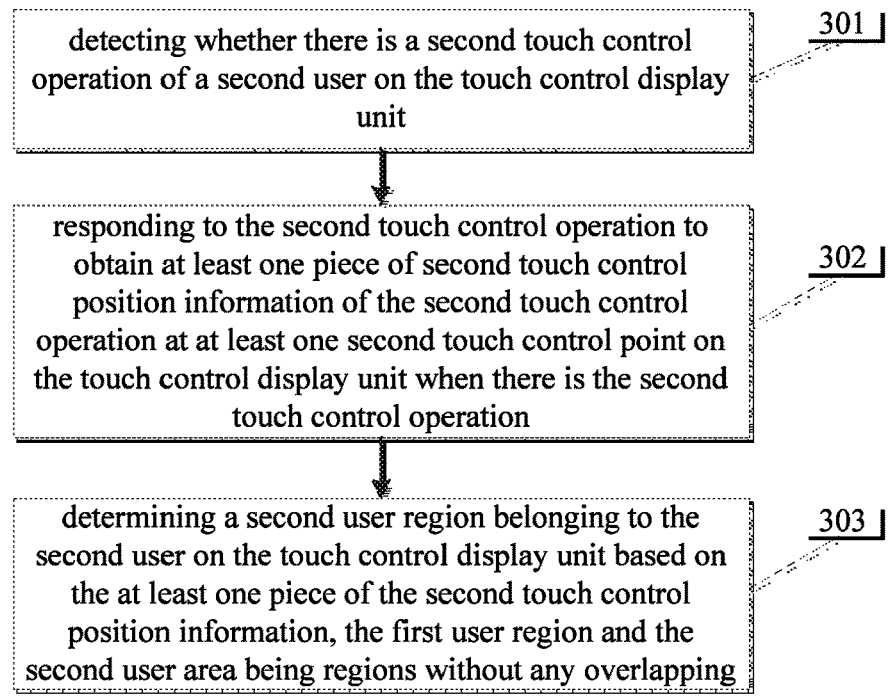
FIG. 3 is a flow chart of specific implementation of determining the second user region for the second user in the method of the embodiments of this application.

The object of the technical solution of the embodiments of this application is to divide the operation region dedicated to a specific user for the user according to touch control position information of the user. Thus, after dividing the first user region for the first user, it needs to divide a second user region for a second user. Of course, the embodiments of this application do not limit the number of the users, however, no matter how many the number of the users is, the technical solutions for dividing specific user regions therefor are the same. Therefore, the embodiments of this application only explain the technical solution of dividing a dedicated user region for the second user as follows, and this technical solution is the same as the technical solution for determining the first user region for the first user as mentioned above, it is only explained simply as follows:

In the specific implementation procedure, the technical solution of determining a second user region for a second user after determining the first user region belonging to the first user on the touch control display unit based on the at least one piece of touch control position information is shown in FIG. 3, which specifically includes:

Step 301: detecting whether there is a second touch control operation of a second user on the touch control display unit;

Then step 302 is proceeded to, step 302 is responding to the second touch control operation to obtain at least one piece of second touch control position information of the second touch control operation on at least one second touch control point on the touch control display unit when there is the second touch control operation;

Step 303 is proceeded to after obtaining at least one piece of second touch control position information, step 303 is determining the second user region belonging to the second user on the touch control display unit based on the at least one piece of second touch control position information, wherein the first user region and the second user area are regions without any overlapping.

And in the specific implementation procedure, the specific implementation procedure of step 303 further includes receiving second ID information corresponding to the second user sent by a second ID transmitter; and determining the second user region belonging to the second user on the touch control display unit based on the second ID information and the at least one piece of second touch control position information.

In specific practical application, in order for different users to communicate to interact with each other better, the embodiments of this application make an optimization processing to the above-described technical solution, that is, after determining the first user region and the second user region, a public region also needs to be divided on the touch control display unit of the electronic apparatus, so that different users can access content in the public region easily and communication between different user regions of different users can be implemented based on the public region. Therefore, after determining the first user region and second user region, the above-described information processing method further includes determining a public region on the touch control display unit based on the first user region and the second user region, wherein the public region is a region that does not overlap with each of the first user region and the second user region.

Figure 4:
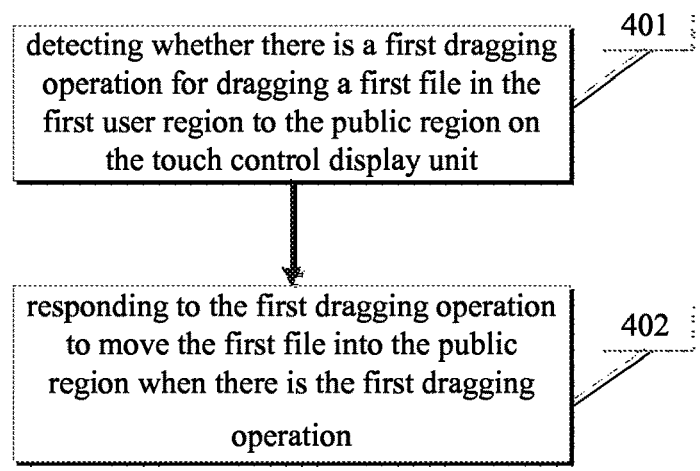
FIG. 4 is a specific flow chart of implementing communication between the first user region and the public region in the embodiments of this application.

After dividing the first user region, the second user region and the public region, communication between the first user region, the second user region and the public region is to be implemented. Since the procedure of communication between the first user region and the public region and the procedure of communication between the second user region and the public region are the same, how to implement communication between the user regions and the public region is explained only by taking the communication between the first user region and the public region as example. In the specific implementation procedure, the specific implementation procedure of the communication between the first user region and the public region is shown in FIG. 4, which includes:

Step 401: detecting whether there is a first dragging operation for dragging a first file in the first user region to the public region on the touch control display unit; and Step 402: responding to the first dragging operation to move the first file into the public region when there is the first dragging operation.

In the above-described technical solution, the first user region and the public region are accessible between each other, thus, the user only needs to drag the file that needs to be communicated into a corresponding region, the file in the first user region can be dragged into the public region, the file in the public region can also be dragged into the first user region. Additionally, the technical solution of implementing communication between the second user region and the public region is the same as the above, and it is no longer described here.

However, the communication between the first user and the second user region is relatively complex, this is because the first user region and the second user region are all dedicated to the users corresponding thereto, thus, the user can only operate in his/her own region, and the user cannot implement communication between the user regions in a communication manner as that between the user regions and the public region. In a specific practical application, the communication between the user regions can be implemented in two ways. The first one is implementing communication between the user regions by using the public region as an agency, which is, the first file that needs to be communicated is dragged into the public region from the first user region by the first user, and then dragged into the second user region from the public region by the second user. Therefore, this solution only needs to add the following technical feature after the technical solution shown in FIG. 4, detecting whether there is a second dragging operation for dragging the first file in the public region to the second user region on the touch control display unit; and responding to the second dragging operation to move the first file into the second user region when there is the second dragging operation.

In the specific implementation procedure, in order to increase privacy between the users, the user regions can make cipher processing to the file in their own regions. Thus, in this case, the specific implementation flow of dragging the first file in the first user region into the public region by the first user includes the following step responding to the first dragging operation to decipher a ciphered first file to obtain a deciphered first file when there is the first dragging operation for dragging the first file from the first user region into the public region; and then moving the deciphered first file into the public region. The specific implementation procedure of dragging the first file in the public region to the second user region by the second user includes responding to the second dragging operation to cipher the first file to obtain the ciphered first file when there is the second dragging operation for dragging the first file from the public region into the second user region; and moving the ciphered first file into the second user region.

Figure 5:
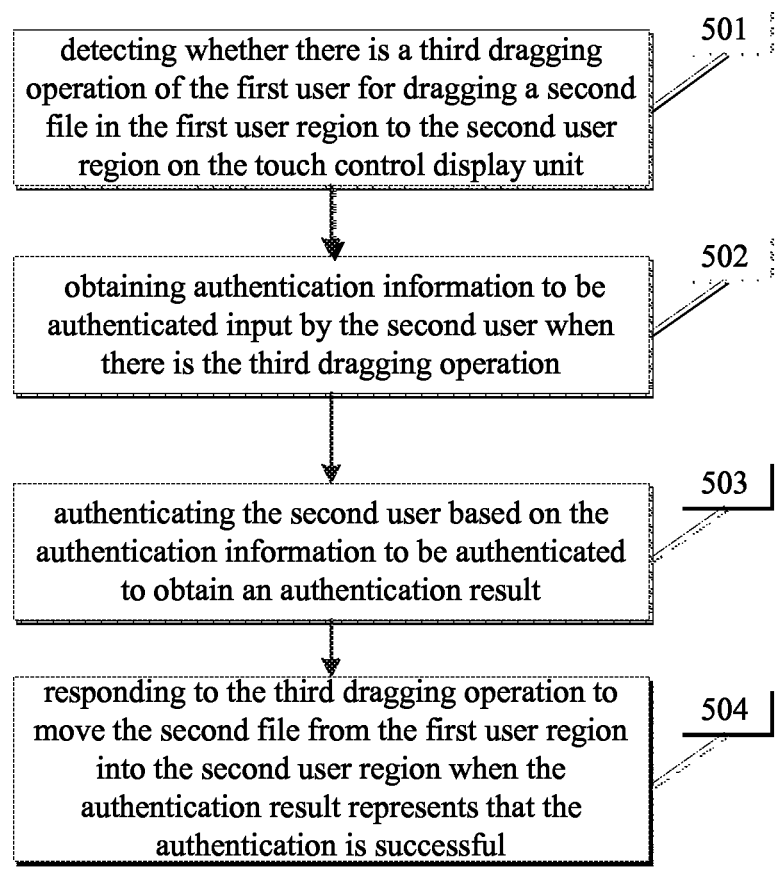
FIG. 5 is a specific flow chart of implementing communication between different user regions based on the authentication information in the embodiments of this application.

In the specific practical application, the second manner of implementing communication between the user regions is by obtaining authentication information in the region in which the file that needs to be communicated. This manner can implement communication between the user regions directly without using the public region as an agency. The specific implementation procedure of this manner is shown in FIG. 5, which includes:

Step 501: detecting whether there is a third dragging operation of the first user for dragging a second file in the first user region to the second user region on the touch control display unit;

Step 502: obtaining authentication information to be authenticated as input by the second user when there is the third dragging operation;

Step 503: authenticating the second user based on the authentication information to be authenticated to obtain an authentication result; and Step 504: responding to the third dragging operation to move the second file from the first user region into the second user region when the authentication result represents that the authentication is successful.

In the specific implementation procedure, the authentication information is actually authorization information for determining whether the user has authority to access a file that is embedded into the authentication information. The authentication information may be a password, and may be information for recognizing the identity of the user such as fingerprint information or the like. When the authentication information is a password and the first user drags the first file from the first user region into the second user region, the authentication authorization is achieved by inputting the password by the second user. In addition, when the authentication information is fingerprint information and the first user drags the first file from the first user region into the second user region, the first user inputs the fingerprint information to determine whether the first user has the authorization to drag the first file from the first user region to the second user region. The technical solution in FIG. 5 of this application is a case that needs the second user to input the authentication information, however, in practical applications, the user inputting the authentication information may be the first user, or the second user.

In order for those skilled in the art to understand the above-described technical solution of the present disclosure more clearly, a more detailed example is described to explain the above technical solution in more detail hereinafter.

Figure 6:
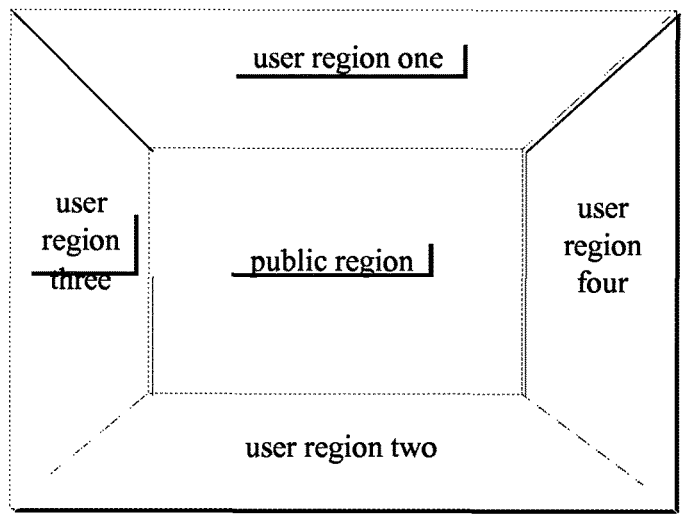
FIG. 6 is a schematic diagram of the division of the regions on the screen of the electronic apparatus having a capacitive screen of 27 inches in the embodiments of this application.

First, the electronic apparatus in the embodiments of the present disclosure is an electronic apparatus having a capacitive screen of 27 inches, and further four ID transmitters are utilized mating with the electronic apparatus. Each ID transmitter corresponds to a unique ID code, and the electronic apparatus can be used by four users at the same time. Of course, the division of the regions of the capacitive screen is not limited to such a manner, a technical solution in which the number of divisions is determined according to selection of the user can be adopted. For example, a selection button for controlling the number of the division of regions of the capacitive screen is provided on the electronic apparatus. When the user presses the selection button, the electronic apparatus can divide the regions of the capacitive screen into a number required by the user according to user's selection automatically. Moreover, in this example, the user regions and the public region on the capacitive screen have been divided in advance, that is, the capacitive screen of the electronic apparatus is divided into four user regions, and one public region, the specific structure thereof is shown in FIG. 6. Further, ID codes of the four ID transmitters are stored in the electronic apparatus. Of course, in a more preferable solution, the user regions on the capacitive screen may not be fixed, instead the user region belonging to the first user is determined in a certain range by the electronic apparatus according to the touch control position information and the first ID code of the first user. For example, the first user makes a touch control operation of drawing a circle on the capacitive screen, and the electronic apparatus can determine the range inside the circle as the user region of the first user according to a series of touch control position information when the first user draws the circle and the first ID code of the first user. Furthermore, the second user can obtain the second user region belonging to him/her in a similar way. For example, the second user can make a touch control operation in a range beyond the user region of the first user by a predetermined distance, and the electronic apparatus determines the second user region belonging to the second user belonging to him/her according to the touch control operation and the second ID code of the second user. The technical solution of this application is explained by taking the user region and the public region being fixed as example here.

When the user wears an ID transmitter to make a touch control operation on the capacitive screen, the ID transmitter would transmit the unique ID code of itself to the electronic apparatus, and the electronic apparatus compares the received unique ID code and the ID code stored by it. When the received unique ID code can be found in the stored ID code, the electronic apparatus determines the region where the touch control position is as a region dedicated to the user according to the touch control position of the user, and only this user can operate in this dedicated region, the operation of other users would not be responded when other users operates. And, the technical procedure of implementing that the user can operate in the dedicated region is the dedicated region can receive the unique ID code sent by the ID transmitter in real time, and the dedicated region only responds to the user operation at the time of receiving the ID code, and does not respond to the user operation when the code received is other ID code.

For example, when the first user wears a first ID transmitter to make a touch control operation in a first user region, after the electronic apparatus receives the first ID code transmitted by the ID transmitter wearied by the first user, the electronic apparatus identifies the first user region as the first ID code according to the specific touch control position information and the first ID code of the first user, that is, when the user makes a touch control operation in first user region, the first user region only responds to the operation of the user at the time of receiving the first ID code at the same time. Then, the procedures of dividing a second user region for the second user, dividing a third user region for the third user and dividing a fourth user region for the fourth user are the same as the above procedure, and it is no longer described here.

The mutual access is not limited between the public regions and the four user regions, for example, if the first user will place a file in the first user region into the public region, he/she only needs to drag the file into the public region; and the access between the four user regions are subjected to a certain limitation. Since the user can only make a touch control operation within a range of his/her own user region, the access between the user regions can be implemented by using the public region, for example, if the first user wants to share an audio file in the first user region with other users, the first user drags the audio file into the public region firstly, and then the user who needs this audio file can drag it from the public region into his/her own user region directly. Of course, in specific applications, in order to increase privacy between users, the file in the user region can be ciphered. Of course, the passwords in each user region are different. Then, in this case, when the user drags the file in the user region into the public region, the electronic apparatus deciphers the ciphered file automatically. Moreover, when the user drags the file in the public region to his/her own user region, cipher processing is carried out to the file, with a password corresponding to the user region to which the user belongs being added.

In addition, the access between the user regions can be implemented in another way, that is, the way of determining whether the user has authority to access the file by inputting authentication information. For example, when the second user needs a file A in the first user region of the first user, the first user can drag the file A to second user region of the second user directly. When the file A enters the second user region, an input box of authentication information is popped out on the capacitive screen, the second user inputs the authentication information in the input box of authentication information, and the authentication information may be a password of the first user region. When the authentication information is successful, the file A can be moved to the second user region. Of course, the authentication information may be fingerprint information, what is inputted in the input box of authentication information should be fingerprint information of the first user at this time, which is for determining that the user has authority to drag the file A to the second user region.

Figure 7:
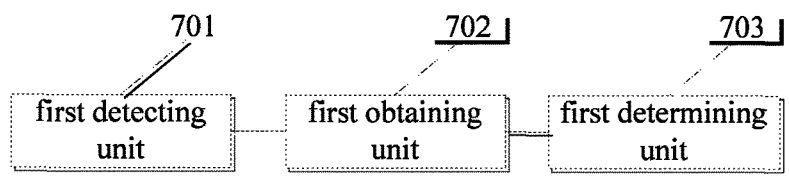
FIG. 7 is a specific structural diagram of the electronic apparatus in the embodiments of this application.

Based on the same inventive concept, the embodiments of the present disclosure also provide an electronic apparatus corresponding to the above information processing method and also for solving the technical problem that a dedicated specific region cannot be divided for a specific user on a large size capacitive screen according to position information of touch control of the specific user so as to be used by the specific user. In the specific practical application, the electronic apparatus is an electronic apparatus having a large size capacitive touch control display unit, which can be applied in a multi-person meeting of a department or a group inside a company. And the specific structure of the electronic apparatus is shown in FIG. 7, which includes:

A first detecting unit 701 for detecting whether there is a first touch control operation of a first user on the touch control display unit;

A first obtaining unit 702 connected to the first detecting unit 701 and for responding to the first touch control operation to obtain at least one piece of first touch control position information of the first touch control operation on at least one first touch control point on the touch control display unit when there is the first touch control operation; and A first determining unit 703 connected to the first obtaining unit 702 and for determining a first user region belonging to the first user on the touch control display unit based on the at least one piece of first touch control position information.

Figure 8:
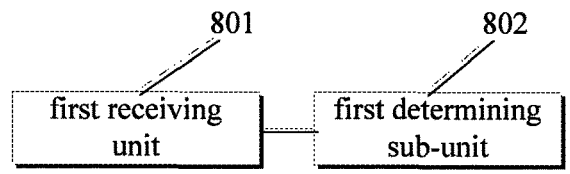
FIG. 8 is a specific structural diagram of the first determining unit in the electronic apparatus in the embodiments of this application.

In the specific implementation procedure, the specific structure of the first determining unit 703 is shown in FIG. 8, which includes:

A first receiving unit 801 for receiving first ID information corresponding to the first user sent by a first ID transmitter; and A first determining sub-unit 802 connected to the first receiving unit 801 and for determining the first user region belonging to the first user on the touch control display unit based on the first ID information and the at least one piece of first touch control position information.

In the specific implementation procedure, the electronic apparatus further includes a second detecting unit for detecting whether there is a second touch control operation of the second user on the touch control display unit; a second obtaining unit connected to the second detecting unit and for responding to the second touch control operation to obtain at least one piece of second touch control position information of the second touch control operation on at least one second touch control point on the touch control display unit when there is the second touch control operation; and a second determining unit connected to the second obtaining unit and for determining a second user region belonging to the second user on the touch control display unit based on the at least one piece of second touch control position information, wherein the first user region and the second user region are regions without any overlapping.

In the specific implementation procedure, the second determining unit specifically includes a second receiving unit for receiving second ID information corresponding to the second user sent by a second ID transmitter; and a second determining sub-unit connected to the second receiving unit and for determining the second user region belonging to the second user on the touch control display unit based on the second ID information and the at least one piece of second touch control position information.

In the specific implementation procedure, the electronic apparatus further includes a third determining unit for determining a public region on the touch control display unit based on the first user region and the second user region, wherein the public region is a region that does not overlap with the first user region or the second user region.

In the specific implementation procedure, the electronic apparatus further includes a third detecting unit for detecting whether there is a first dragging operation for dragging the first file in the first user region to the public region on the touch control display unit; and a first executing unit connected to the third detecting unit and for responding to the first dragging operation to move the first file into the public region when there is the first dragging operation.

In the specific implementation procedure, the electronic apparatus further includes a fourth detecting unit for detecting whether there is a second dragging operation for dragging the first file in the public region to the second user region on the touch control display unit; and a second executing unit connected to the fourth detecting unit and for responding to the second dragging operation to move the first file into the second user region when there is the second dragging operation.

Figure 9:
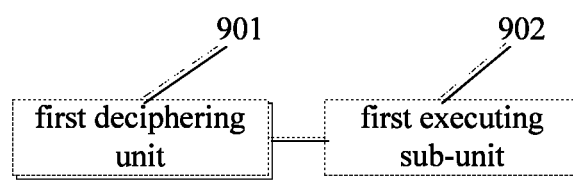
FIG. 9 is a specific structural diagram of the first executing unit in the electronic apparatus in the embodiments of this application.

In the specific implementation procedure, the specific structure of the first executing unit is shown in FIG. 9, which includes:

A first deciphering unit 901 for responding to the first dragging operation to decipher the ciphered first file to obtain a deciphered first file; and A first executing sub-unit 902 connected to the first deciphering unit 901 and for moving the deciphered first file into the public region.

Figure 10:
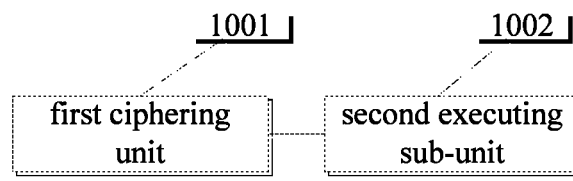
FIG. 10 is a specific structural diagram of the second executing unit in the electronic apparatus in the embodiments of this application.

In the specific implementation procedure, the specific structure of the second executing unit is shown in FIG. 10, which includes:

A first ciphering unit 1001 for responding to the second dragging operation to cipher the first file to obtain the ciphered first file; and A second executing sub-unit 1002 connected to the first ciphering unit 1001 and for moving the ciphered first file into the second user region.

In the specific implementation procedure, the electronic apparatus further includes a fifth detecting unit for detecting whether there is a third dragging operation of the first user for dragging a second file in the first user region to the second user region on the touch control display unit; a third obtaining unit connected to the fifth detecting unit and for obtaining authentication information to be authenticated as input by the second user when there is the third dragging operation; a fourth obtaining unit connected to the third obtaining unit and for authenticating the second user based on the authentication information to be authenticated to obtain an authentication result; and a third executing unit connected to the fourth obtaining unit and for responding to the third dragging operation to move the second file from the first user region into the second user region when the authentication result represents that the authentication is successful.

Since the electronic apparatus is a device corresponding to the above information processing method, this application no longer explains the electronic apparatus by example here.

The above explanation of the specific structure of the electronic apparatus is not for limiting the scope of the structure, the function of the specific structure can be implemented by means of hardware or software, all of the structures that can replace the specific structure explained and can achieve the function that the specific structure has are in the range sought for protection of this application.

With one or more of technical solutions in the embodiments of this application, the following technical effect can be implemented:

(1) Since a technical solution in which a touch control region belonging to a specific user is determined according to touch control position information of the specific user in combination with unique ID information of the specific user is adopted, it solves the technical problem that a dedicated specific region cannot be divided for the specific user on a large size capacitive screen according to the touch control position information of the specific user so as to be used by the specific user in the prior art, and has the technical effect of being able to divide different touch control regions for different users on a touch control display unit.

(2) Furthermore, since different touch control regions can be divided for different users on a touch control display unit, different users can only operate on their own touch control regions, thus, it has an effect of protecting personal privacy of the user better.

The method of the present disclosure does not limited to the embodiments in the specific implementation mode, and those skilled in the art can obtain other implementation modes according to the technical solution of the present disclosure, thus, other implementation modes belong to the scope of technical innovation of the present disclosure.

It is obvious that those skilled in the art can make various modifications and variations to the present disclosure without departing from the spirit and scope of the present disclosure. Thus, if these modifications and variations of the present disclosure fall within the scope of the claims of the present disclosure and their equivalent technology, the present disclosure is intended to comprise these modifications and variations.

What is claimed is:

1. An information processing method applied in an electronic apparatus having a touch control display unit, the method comprising:

detecting whether there is a first touch control operation of a first user on the touch control display unit;

responding to the first touch control operation to obtain a series of first touch control position information of the first touch control operation on a series of touch control points on the touch control display unit when there is the first touch control operation;

receiving first ID information corresponding to the first user sent by a first ID transmitter; comparing the received first ID information and ID information stored in the electronic apparatus;

when the first ID information is found in the stored ID information, dividing the touch control display unit to determine a first user region belonging to the first user on the touch control display unit based on the series of first touch control position information and the first ID information, position and range of the first user region being not fixed and being determined based on position and range of an area which is drawn by the first touch control operation of the first user;

detecting whether there is a second touch control operation of a second user on the touch control display unit;

responding to the second touch control operation to obtain at least one piece of second touch control position information of the second touch control operation on at least one second touch control point on the touch control display unit when there is the second touch control operation;

determining a second user region belonging to the second user on the touch control display unit based on the at least one piece of second touch control position information, the first user region and the second user area being regions without any overlapping, detecting whether there is a third dragging operation of the first user for dragging a first file in the first user region to the second user region on the touch control display unit;

obtaining authentication information to be authenticated as input by the second user when the first file enters the second user region, the authentication information is a password of the first user region;

authenticating the second user based on the authentication information to be authenticated to obtain an authentication result; and responding to the third dragging operation to move the first file from the first user region into the second user region when the authentication result represents that the authentication is successful.

2. The method according to claim 1, wherein determining the second user region belonging to the second user on the touch control display unit based on the at least one piece of second touch control position information specifically comprises:
receiving second ID information corresponding to the second user sent by a second ID transmitter; and
determining the second user region belonging to the second user on the touch control display unit based on the second ID information and the at least one piece of second touch control position information.

3. The method according to claim 2, wherein after determining the second user region belonging to the second user on the touch control display unit, the method further comprises: determining a public region on the touch control display unit based on the first user region and the second user region, the public region being a region that does not overlap with the first user region or the second user region.

4. The method according to claim 3, wherein after determining the public region on the touch control display unit, the method further comprises:
detecting whether there is a first dragging operation for dragging a first file in the first user region to the public region on the touch control display unit; and
responding to the first dragging operation to move the first file into the public region when there is the first dragging operation.

5. The method according to claim 4, wherein after responding to the first dragging operation to move the first file into the public region when there is the first dragging operation, the method further comprises:
detecting whether there is a second dragging operation for dragging the first file in the public region into the second user region on the touch control display unit; and
responding to the second dragging operation to move the first file into the second user region when there is the second dragging operation.

6. The method according to claim 4, wherein when the first file is a ciphered first file, responding to the first dragging operation to move the first file into the public region when there is the first dragging operation specifically comprises:
responding to the first dragging operation to decipher the ciphered first file to obtain a deciphered first file; and
moving the deciphered first file into the public region.

7. The method according to claim 5, wherein responding to the second dragging operation to move the first file into the second user region when there is the second dragging operation specifically comprises:
responding to the second dragging operation to cipher the first file to obtain a ciphered first file; and
moving the ciphered first file into the second user region.

8. An electronic apparatus comprising: a touch control display unit; a memory configured to store a computer program; a processor configured to perform the computer program to: detect whether there is a first touch control operation of a first user on the touch control display unit;
respond to the first touch control operation to obtain a series of touch control position information of the first touch control operation on a series of touch control points on the touch control display unit when there is the first touch control operation; and receive first ID information corresponding to the first user sent by a first ID transmitter; compare the received first ID information and ID information stored in the electronic apparatus;
when the first ID information is found in the stored ID information, divide the touch control display unit to determine a first user region belonging to the first user on the touch control display unit based on the series of first touch control position information and the first ID information, position and range of the first user region being not fixed and being determined based on position and range of an area which is drawn by the first touch control operation of the first user,
detect whether there is a second touch control operation of a second user on the touch control display unit;
respond to the second touch control operation to obtain at least one piece of second touch control position information of the second touch control operation on at least one second touch control point on the touch control display unit when there is the second touch control operation; and
determine a second user region belonging to the second user on the touch control display unit based on the at least one piece of second touch control position information, the first user region and the second user area being regions without any overlapping,
detect whether there is a third dragging operation of the first user for dragging a first file in the first user region to the second user region on the touch control display unit;
obtain authentication information to be authenticated as input by the second user when the first file enters the second user region, the authentication information is a password of the first user region;
authenticate the second user based on the authentication information to be authenticated to obtain an authentication result; and
respond to the third dragging operation to move the first file from the first user region into the second user region when the authentication result represents that the authentication is successful.

9. The electronic apparatus according to claim 8, wherein the processor is further configured to: receive second ID information corresponding to the second user sent by a second ID transmitter; and determine the second user region belonging to the second user on the touch control display unit based on the second ID information and the at least one piece of second touch control position information.

10. The electronic apparatus according to claim 9, wherein the processor is further configured to: determine a public region on the touch control display unit based on the first user region and the second user region, the public region being a region that does not overlap with the first user region or the second user region.

11. The electronic apparatus according to claim 10, wherein the processor is further configured to: detect whether there is a first dragging operation for dragging a first file in the first user region to the public region on the touch control display unit; and
respond to the first dragging operation to move the first file into the public region when there is the first dragging operation.

12. The electronic apparatus according to claim 11, wherein the processor is further configured to:
detect whether there is a second dragging operation for dragging the first file in the public region to the second user region on the touch control display unit; and respond to the second dragging operation to move the first file into the second user region when there is the second dragging operation.

13. The electronic apparatus according to claim 11, wherein the processor is further configured to:
    respond to the first dragging operation to decipher the ciphered first file to obtain a deciphered first file; and
    move the deciphered first file into the public region.

14. The electronic apparatus according to claim 12, wherein the processor is further configured to:
    respond to the second dragging operation to encrypt the first file to obtain the ciphered first file; and
    move the ciphered first file into the second user region.

* * * * *